Sept. 29, 1942.   J. GATTONI   2,297,141
PRECISION BALANCE
Original Filed Feb. 8, 1938
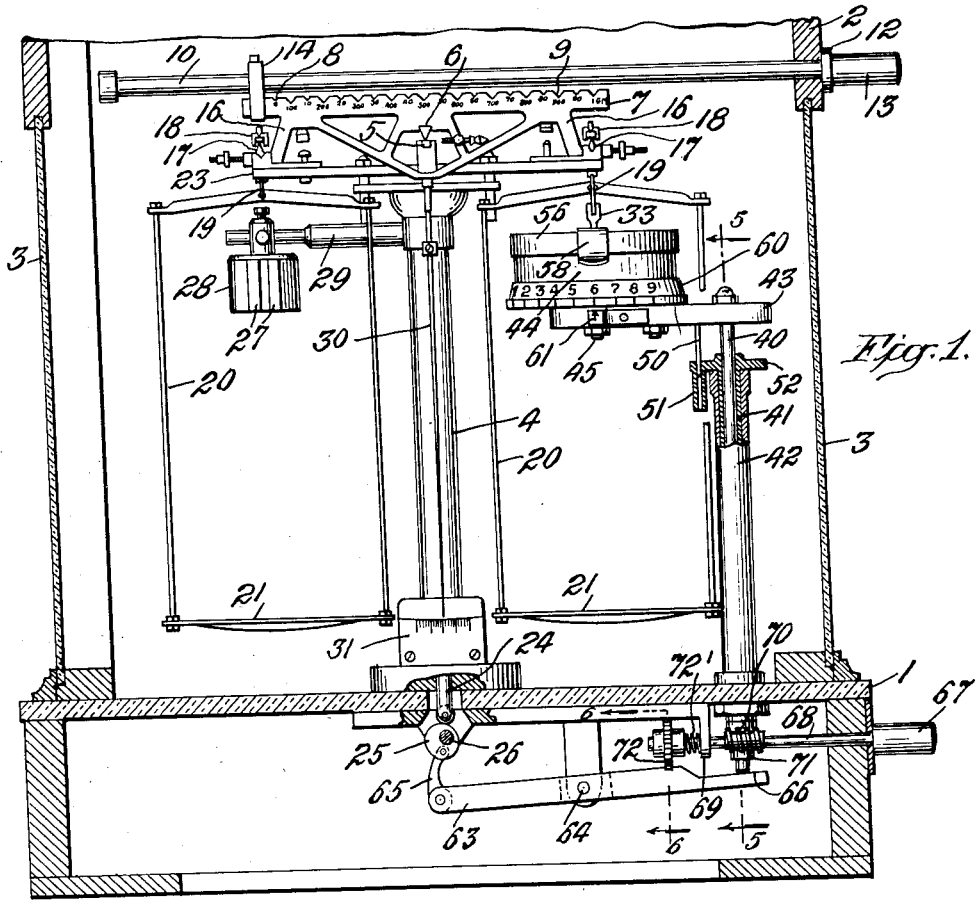
Fig. 1.
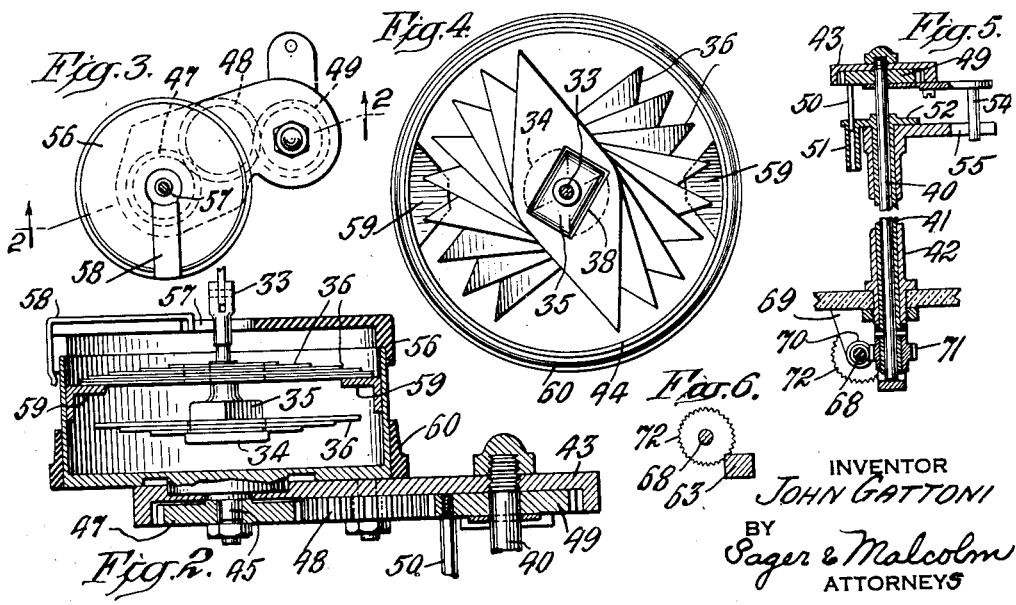
Fig. 3.  Fig. 4.  Fig. 5.
Fig. 2.  Fig. 6.
INVENTOR
JOHN GATTONI
BY
Sager & Malcolm
ATTORNEYS Patented Sept. 29, 1942

2,297,141

UNITED STATES PATENT OFFICE 2,297,141

PRECISION BALANCE

John Gattoni, Union City, N. J., assignor to Seederer-Kohlbusch, Inc., Jersey City, N. J., a corporation of New Jersey Original application February 8, 1938, Serial No. 189,314. Divided and this application March 11, 1940, Serial No. 323,412

5 Claims. (Cl. 265—54)

This invention relates to balances and is a division of my copending application Serial No. 189,314, filed February 8, 1938, now Patent No. 2,192,905, issued March 12, 1940.

The object of the invention is to provide an improved precision balance for quickly and accurately weighing objects of relatively small mass.

Another object of the invention is to provide a balance of the above type in which weighing can be accomplished easily, quickly and accurately, and in which a wider variety of weight combinations can be obtained with fewer parts and adjustments than heretofore.

The invention is particularly applicable to sensitive balances of the type employed by analysts, chemists, jewelers, etc. As is well known, balances of this type include a beam which is delicately balanced on a knife edge and carries a pan or a plurality of pans for supporting the substance to be weighed as well as a set of known weights which are used in the weighing operation. These balances customarily employ movable poises on the beam, or adjustable chains, etc., suspended from the beam for weighing purposes.

My invention resides in the provision of a weight support which may be suspended from a balance beam and which is adapted to support a plurality of weights which are stacked thereon in superimposed relation, and in the provision of means for lifting these weights off or placing them on the support in any desired number in accordance with the nature of the substance to be weighed. In this manner any desired number of known weights may be pivotally suspended from a common point on the beam, and all said weights may be controlled by the manipulation of a single shaft or other control means operated from outside the balance case.

Another feature of the invention resides in the provision of means for coordinating the operation of the weight lifting mechanism with the operation of the bridge or cradle which serves to lift the pivoted beam and pan supports off their respective knife edge bearings when the weights and materials are being deposited on or removed from the balance. By so coordinating the operation of these mechanisms I make it possible to move the weights on and off the weight support only when the beam and pan supports are off their bearings and in a position of rest, which prevents jarring of the delicate mechanisms and furthermore expedites the weighing operation.

These and other features and advantages of the invention will be described in detail in connection with the accompanying drawing, in which:

Fig. 1 is a front elevation of a balance embodying my invention;

Fig. 2 is a vertical sectional view of the weight-lifting mechanism, taken on line 2—2 of Fig. 3;

Fig. 3 is a plan view showing the gears controlling the operation of the dial and weight-selecting mechanism;

Fig. 4 is a plan view of the weights and the adjustable lifting means;

Fig. 5 is a vertical sectional view taken on line 5—5 of Fig. 1; and

Fig. 6 is a detail section taken on line 6—6 of Fig. 1.

The balance shown in the drawing has a base 1 supporting case 2 which encloses the device and is provided with transparent windows 3 and a sliding front of the type commonly employed in balances of this type.

The base supports a standard 4 having a knife edge bearing 5 carrying the central knife edge 6 of beam 7 as shown in Fig. 1.

The balance shown herein for purposes of illustration is calibrated in terms of grams, and the beam 7 is provided with two coextensive sets of calibrations and notches 8 and 9 respectively, being similar in this respect to the beam disclosed in J. E. Seederer Patent #1,972,603 of September 4, 1934. The smaller series of notches 8 comprises ten notches calibrated from zero to 90 milligrams by ten milligram increments, while the larger series of notches 9 comprises ten notches calibrated from zero to 1,000 milligrams by one hundred milligram increments.

A rotatable and horizontally movable shaft 10 is suitably mounted in the case 2 adjacent the top of the beam 7, passing through a bearing 12 in the case and being provided with a knob or finger piece 13 outside the case for controlling the movement of the shaft. Within the case, shaft 10 carries an arm 14 having a pair of opposed grips of standard construction which are adapted to receive the poises commonly employed in balances of this type for the purpose of lifting the poises and carrying them from one of the notches 8 or 9 to another such notch when the shaft 10 is actuated from outside the case.

The beam 7 has depending arms 16 at its outer ends carrying suitable knife edges 17 on which rest the knife edge bearings of yoke frames 18. These yoke frames carry pivoted hooks 19 which support the bows 20 of conventional weighing pans 21 as shown in Fig. 1. The standard 4 also supports the usual bridge or cradle 23 which is raised and lowered by vertical plunger 24 within the standard 4 for the purpose of lifting beam 7 and yoke frames 18 off their respective knife edge bearings when the weights and materials are being placed in and removed from pans 21 or when the balance is not in use. Plunger 24 is actuated by a cam 25 carried by rotatable shaft 26 which extends through the bottom of the case and is rotated by a suitable knob which is conveniently located at the front of the balance.

The balance shown here for purposes of illustration is also provided with a magnetic damper consisting of a suitable aluminum or other non-magnetic damping plate which is suspended from the yoke frame 18 at the left-hand end of the beam as viewed in Fig. 1 and is adapted to move up and down between the closely spaced poles 27 of a permanent magnet 28 which is carried by a bracket 29 mounted on standard 4 as set forth in my Patent #1,900,641 of March 7, 1933. In this manner swinging movement of the pan bows 20 and associated parts are isolated from the damping plate and the damping plate is prevented from striking against the poles of the magnet which would seriously affect the sensitivity and accuracy of the balance. The eddy currents set up by moving the damping plate through the magnetic field dampen the motion of the beam and bring the balance to rest in a few seconds. The beam 7 carries the usual pointer 30 which moves over a scale 31 at the front of the balance as shown in Fig. 1.

The hook 19 at the right-hand end of the beam 7, as viewed in Fig. 1, has a depending extension 33 carrying a flat-faced weight support 34 having a centrally disposed lug 35 of rectangular cross-section which serves to center a plurality of superimposed weights 36 on the support 34 as shown in Figs. 2 and 4. In the embodiment illustrated, the weights 36 are nine in number, each weighing one gram. These weights are all of the same general flat "diamond" shape and they all contain central cut-out portions or holes 38 of rectangular shape adapted to fit over the rectangular lug 35 so as to permit the weights to rest one above the other upon the support 34. As illustrated in Figs. 2 and 4, however, the rectangular holes 38 are staggered in the respective weights 36 in such a way that the weights are caused to spread out fan-like with the diametrically opposite outer ends of each weight projecting free and clear of their neighbors when the weights are superimposed in nested position on the support 34 as in Fig. 4 of the drawing. When all the weights 36 are thus stacked on the support 34 it will be evident that their combined weight of nine grams will be suspended from a single point on beam 7. However, by means of the weight lifting mechanism illustrated in Figs. 1 to 6 it is possible to lift any desired number of the weights 36 off the support 34 and therefore off the balance beam.

The mechanism for lifting and supporting the weights 36 clear of the weight support 34 includes a vertically movable rod 40 mounted inside a rotatable sleeve 41 within a column 42 supported on the base of the balance as shown in Figs. 1 and 5. The vertically movable rod 40 supports a platform 43 on which a cylindrical housing 44 is rotatably mounted by means of a shaft 45 which is journaled in the platform 43 as shown in Fig. 2. The shaft 45 of housing 44 carries a gear 47 meshing with an idler gear 48 which, in turn, meshes with a gear 49 which is rotatably mounted on the vertically movable rod 40 as shown in Figs. 2 and 5. Gear 49 carries a depending pin 50 which telescopes within a small cylindrical sheath 51 carried by the head 52 of the rotatable sleeve 41 as shown in Figs. 1 and 5. Hence when sleeve 41 is rotated, by means hereinafter described, the head 52 and sheath 51 are likewise rotated, causing rotation of pin 50 and gear 49 which therefore cause rotation of idler gear 48, gear 47, shaft 45 and housing 44. However, it will be noted that the vertical plunger-like movement of the depending pin 50 of gear 49 in sheath 51 permits the platform 43 carrying the train of gears and the housing 44 to move up and down with the rod 40 when said rod is actuated by the means hereinafter described. The vertically movable platform 43 also carries a depending guide pin 54 which acts in a bifurcated extension 55 mounted on the column 42 as shown in Fig. 5.

The cylindrical housing 44 is positioned in alignment with the support 34 carrying the weights 36 and is of a diameter sufficient to receive these weights when they are in the fan-like nested position shown in Fig. 4. The weights are thus permanently carried within the housing 44 and the housing is preferably enclosed by a cover 56 having a radial slot 57 which permits the cover to be slipped over the extension 33 carrying weight support 34, after which slot 57 may be closed by means of a metal strip 58 which is adapted to be clamped over the edge of the cover 56 as shown in Fig. 2. Within the housing 44 there are mounted two diametrically opposite flat-faced segments or ledges 59 of suitable size and shape, which are adapted to engage and lift the weights 36 off their support 34 in any desired combination for the purpose of adding weights to or subtracting weights from the support 34. For this purpose the segments 59 are so positioned on the peripheral wall of housing 44 that they will lie beneath the horizontal plane of the weights 36 when the housing 44 has been lowered by the descent of the actuating rod 40 in the column 42.

When the rod 40 and housing 44 are in their lowered position, with segments 59 lying beneath the plane of the weights 36, the weights 36 will all rest on their common support 34 in the fan-like position illustrated in Fig. 4, and it will be evident that the housing 44 may be freely rotated by rotation of sleeve 41 in column 42 to bring the weight-lifting segments 59 into a position where they will either clear all of the weights 36 or else will engage any weight or combination of weights 36 when the housing 44 is subsequently raised by the elevation of rod 40 in column 42. In Fig. 4, for example, the housing 44 has been rotated to a position such that the segments 59 are directly beneath the fourth and fifth weights 36, counting from the bottom of the stack of weights, and it will therefore be evident that when housing 44 is subsequently raised by raising rod 40 the segments 59 will lift the fourth and fifth weights 36 as well as the sixth, seventh, eighth and ninth weights which are superimposed thereon, and that only the three weights at the bottom of the pile will remain suspended on the support 34 as shown in Fig. 2. When this condition prevails the total weight suspended on the support 34 is that represented by the three lowermost weights, or in this case three grams since these weights are each one gram as stated above. In order to indicate the weights carried by the weight support 34 the housing 44 carries a dial 60 cooperating with a pointer 61 which is marked on the platform 43 as shown in Fig. 1. The dial 60 is graduated in grams from "0" to "9" by one gram increments, the calibrations corresponding to the number of possible combinations in which the weights 36 may be suspended on the support 34 as described above.

The vertical movement of rod 40 carrying platform 43 and housing 44 is controlled by a lever 63 which is pivoted to the underside of the base 1 at 64. At one end lever 63 is pivotally connected by a link 65 to the cam 25 carried by the rotatable shaft 26 which controls the vertical movement of plunger 24 for raising and lowering the cradle 23 of the balance as previously described; while the opposite end of lever 63 is shaped as indicated at 66 to engage and support the lower end of rod 40. Accordingly, rotation of control shaft 26 in a clockwise direction as viewed in Fig. 1 causes lever 63 to cant in a clockwise direction, thereby lowering rod 40 in column 42 and therefore also lowering platform 43 and housing 44 so that all of the weights 36 will be suspended on support 34 and segments 59 will lie beneath the plane of the weights 36; and at the same time cam 25 of control shaft 26 will raise plunger 24 in the main column 4 of the balance and thereby raise the cradle 23 which lifts the beam 7 and yoke frames 18 off their respective knife edge bearings. When the parts are in this position, rotation of sleeve 41 may be accomplished by means of a knob or fingerpiece 67 carried by shaft 68 which is journaled in the side of the balance case 2 and in a bracket 69 which depends from the base 1 as shown in Figs. 1 and 5. Shaft 68 carries a worm 70 which meshes with a worm wheel 71 keyed to the sleeve 41 as shown in Fig. 5. As illustrated in Figs. 1, 5 and 6, shaft 68 carries a toothed wheel 72 which is adapted to be engaged by the edge of lever 63 when said lever is canted to the position shown in Fig. 1, at which time platform 43 and housing 44 are raised, this being the operative weighing condition of the balance. At such time it is desirable to prevent rotation of the housing which would cause the weights carried by segments 59 to turn with the housing and thereby get out of alignment with the centering lug 35 of the weight support 34. A compression spring 72' may be provided as shown in Fig. 1 to maintain shaft 68 and associated elements in their proper relative positions.

It is to be understood that the balance described above and shown in the drawing has been selected solely for the purpose of illustrating a representative example of my invention and that various changes may be made in the details of construction and method of operation herein shown and described without departing from the scope and spirit of the invention as defined in the appended claims.

The invention claimed is:

1. A balance comprising a standard, a beam having a knife edge pivoted on said standard, a movable cradle for lifting said beam on and off its pivot, a weight support pivotally suspended from said beam, a plurality of weights adapted to be stacked one on top of the other on said support, a weight lifting device mounted on said balance having means for selectively lifting various numbers of said stacked weights on and off said support, control means for operating said cradle, and means operated by said control means for preventing the operation of said weight lifting device when said beam is on its pivot.

2. A balance comprising a pivoted beam, a weight support pivotally suspended from said beam, a plurality of flat diamond-shaped weights adapted to be stacked one upon the other in staggered relation on said support so as to leave the outer ends of said weights free and clear of each other, and means for selectively engaging the free ends of said weights and for lifting the engaged weight and those above it on and off said support.

3. A balance comprising a pivoted beam, a weight support pivotally suspended from said beam having means for centering a plurality of weights thereon, a plurality of flat diamond-shaped weights adapted to be stacked one upon the other in fan-like position on said support with their outer ends projecting clear of each other and having means engageable with said centering means to hold them in such position on said support, and means for selectively engaging the projecting ends of said weights and for lifting the engaged weight and those above it off and on said support.

4. A balance comprising a pivoted beam, a weight support pivotally suspended from said beam having means for centering a plurality of weights thereon, a plurality of flat diamond-shaped weights adapted to be stacked one upon the other in fan-like position on said support with their outer ends projecting clear of each other and having means engageable with said centering means to hold them in such position on said support, rotating weight lifting members adjacent said support adapted to be rotated selectively beneath the projecting ends of said weights, means for rotating said weight lifting members, and means for raising and lowering said weight lifting members to selectively lift said weights off and on said support.

5. A balance comprising a standard, a beam having a knife edge pivoted on said standard, a movable cradle for lifting said beam on and off its pivot, a weight support pivotally suspended from said beam, a plurality of flat weights adapted to be stacked one upon the other in fan-like position on said support with their ends projecting clear of each other, a rotatable and vertically movable weight lifting device adjacent said support having means for selectively engaging said weights, a shaft for rotating said device for selecting said weights, means for raising and lowering said device to lift the selected weight off and on said support, control means for operating said cradle, and means operated by said control means for locking said shaft to prevent rotation of said weight selecting device when said beam is on its pivot.

JOHN GATTONI.